Sept. 20, 1932.   W. STUEBING, JR   1,878,726
LIFT TRUCK
Original Filed April 21, 1928   2 Sheets-Sheet 1
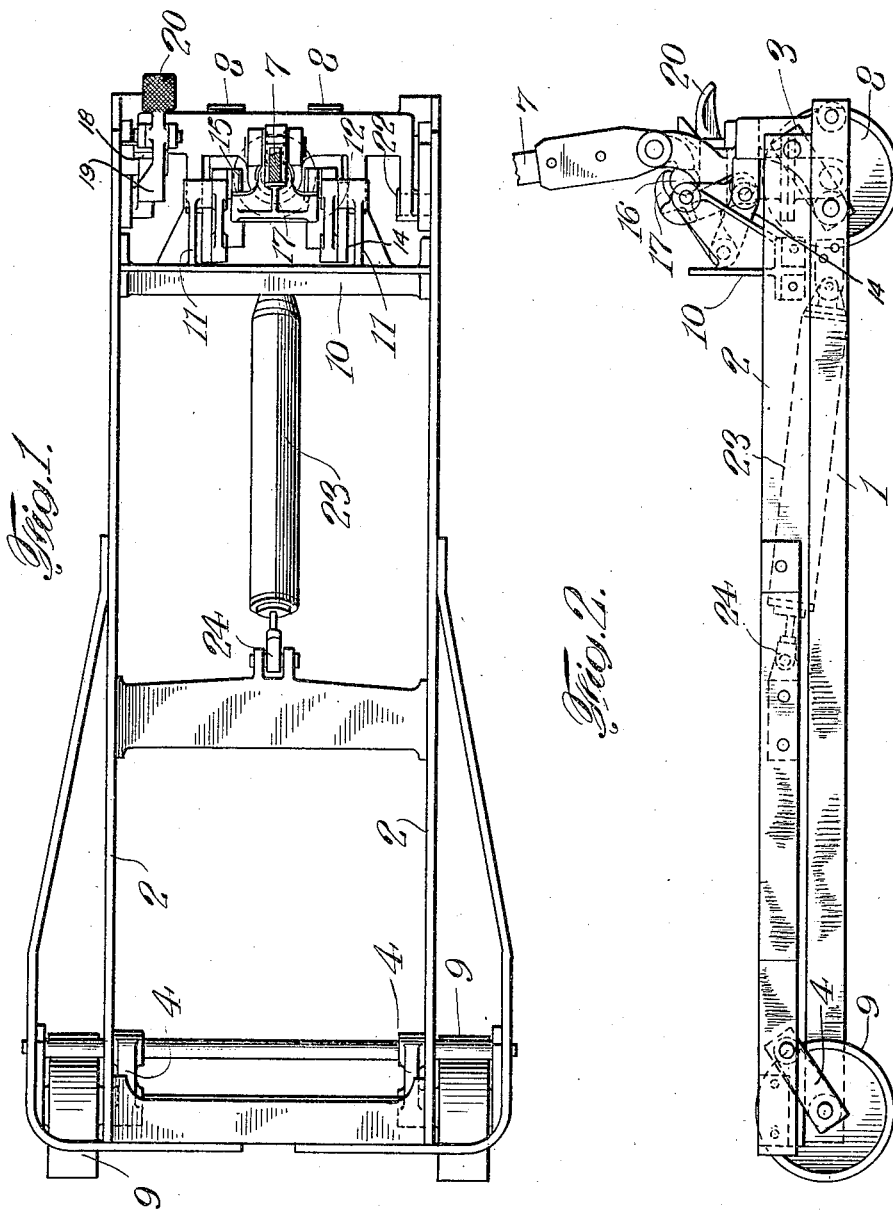

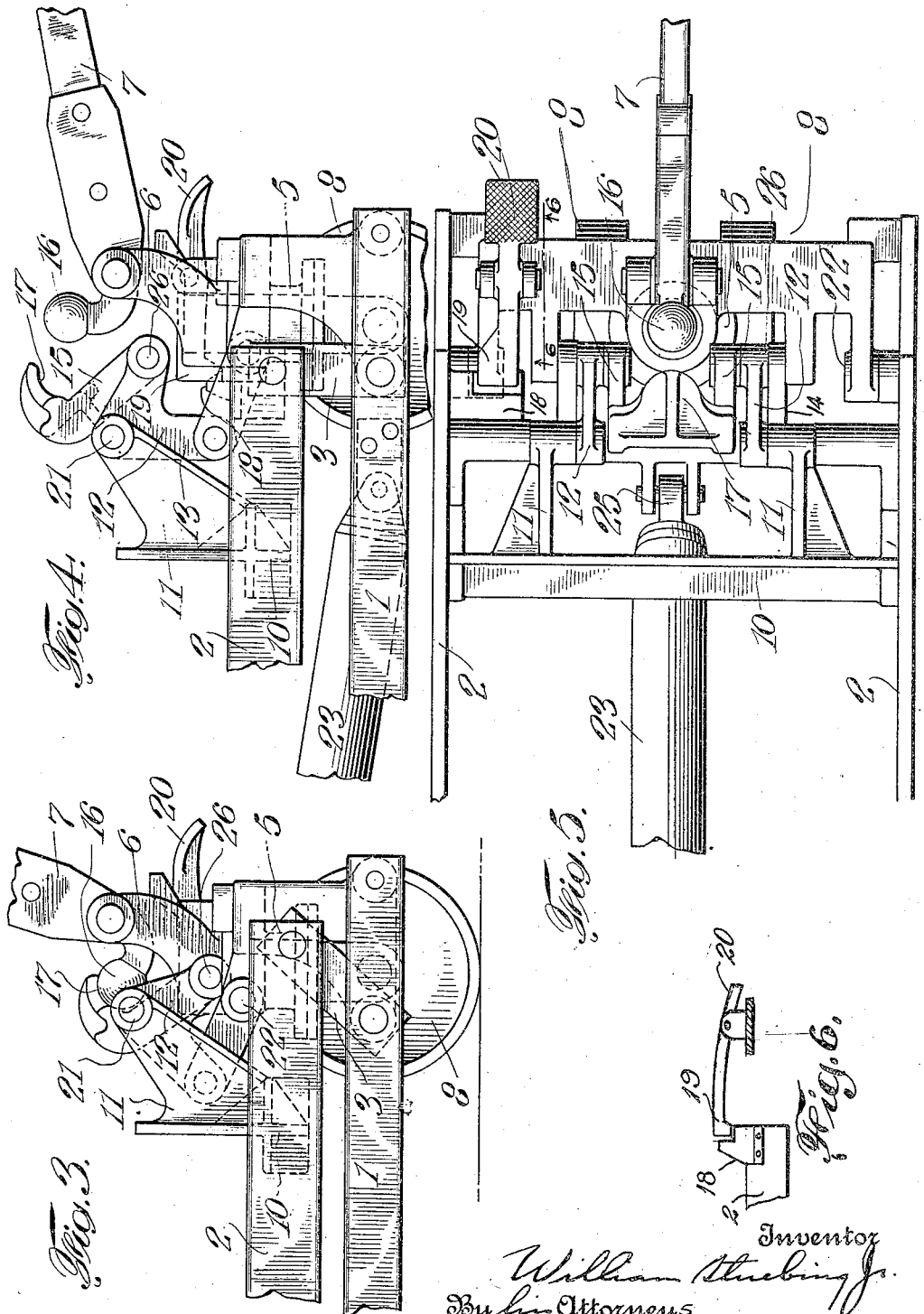

Patented Sept. 20, 1932

1,878,726

UNITED STATES PATENT OFFICE

WILLIAM STUEBING, JR., OF CINCINNATI, OHIO

LIFT TRUCK

Application filed April 21, 1928, Serial No. 271,784. Renewed June 12, 1931.

This invention relates to lift trucks. It is an object of the invention to provide a truck which shall be simple and inexpensive to manufacture, which shall be durable and capable of withstanding the rough treatment to which such trucks are customarily subjected which shall be capable of operation from the side as well as from the front of the truck, and which shall incorporate certain safety features designed to protect the operator from injury.

Other objects and advantages of the invention will appear hereinafter.

A preferred embodiment of the invention selected for purposes of illustration is shown in the accompanying drawings, in which, Figure 1 is a top plan view.

Figure 2 is a side elevation.

Figure 3 is an enlarged side elevation of the forward end of the truck showing the elevating frame partially elevated.

Figure 4 is a similar view showing the elevating frame completely elevated.

Figure 5 is a top plan view of Figure 4, and

Figure 6 a detail on the line 6—6 of Figure 5 illustrating one form of latch or detent means for releasably holding the elevating frame in raised position.

Referring to the drawings, the truck comprises a main frame 1 and an elevating frame 2 pivotally mounted thereon by means of links 3 and 4 arranged respectively near the front and rear ends of the truck. As will be observed, when the elevating frame is in its lowermost position the links 3 and 4 are inclined forwardly, so that the elevating frame moves rearwardly and upwardly while approaching its elevated position. The lower part of the steering head carries the wheels 8 which support the forward end of the truck while the rear end of the truck is supported on wheels 9.

Mounted on the forward end of the main frame is a swivelled steering head 5 carrying a fork 6 upon which is pivotally mounted the steering tongue 7.

Near the forward end of the elevating frame 2 is secured a cross piece 10 having a pair of forwardly projecting members 11 upon which are pivotally mounted a pair of bell cranks 12. One arm 13 of each of the bell cranks is pivotally secured to a link 14, which in turn is pivotally secured to the main frame, while the other arm of each of the bell cranks is pivotally secured to the lower end of the hook member 15.

The steering tongue 7 is provided with a rearward extension terminating in a ball 16 which is adapted to cooperate with the transverse groove 17 of the hook member for lifting purposes as hereinafter described.

Mounted on the elevating frame 2 is a lug 18 which is adapted to cooperate with a latch member 19 which is pivotally mounted on the main frame. The said latch member is preferably provided with a treadle 20 for convenience in operation. As will be apparent, when the elevating frame is raised as illustrated in Figure 4, the latch 19 will engage the lug 18 and will remain in engagement to hold the frame in elevated position until released by depression of the treadle 20.

When it is desired to raise the elevating frame, the tongue is swung upwardly and the hook 15 is swung forwardly by hand into engagement with the ball 16 as illustrated in Figure 2. The tongue 7 is then swung downwardly, and, as illustrated in Figure 3, the bell cranks 12 swing about the pivots 21, thus causing the elevating frame to be thrust rearwardly and upwardly. As will be observed, the direction of thrust which is transmitted to the elevating frame is along the line connecting the pivots 21 and 22, so that, as illustrated in Figure 2, the direction of thrust at the beginning of elevating movement is in substantially the same direction as the movement of the frame. Furthermore, as the elevating frame, due to its pivoted connection with the main frame, begins to move rearwardly, as well as upwardly, the direction of thrust, as illustrated in Figures 3 and 4, is also inclined rearwardly, so that to some extent, the direction of thrust changes and follows the direction of movement of the elevating frame. This feature is of advantage in securing smooth and easy lifting action.

When the elevating frame is completely raised, the lug 18 is engaged by the latch 19 and the frame is thus retained in raised position until the latch is released. In order that the descent of the frame may be retarded, a hydraulic check 23 of any suitable design may be secured to the elevating frame and the main frame as by pivotal connections 24 and 25.

It is also desirable to provide means whereby the hook 15 will remain in engagement with the ball 16 after being once engaged prior to the lifting operation, but so arranged that after the lifting operation is completed the hook may be automatically disengaged.

Accordingly, the hook 15 is so shaped and balanced and so positioned on the bell crank arms that when the elevating frame is in lowermost position and the hook is swung forwardly, by any suitable means, as by hand in the illustrated embodiment its center of gravity will lie forwardly of the pivots 26 and it will therefore remain in engagement with the ball.

On the other hand, during the raising of the frame the pivot 26 moves forwardly to a point in front of the center of gravity of the hook so that after the elevating frame is raised and the tongue 7 is swung upwardly to a position for pulling the truck, the hook will fall backward, as illustrated in Figure 4, out of engagement with the ball where it remains until it is again swung forwardly.

Referring to Figure 2, it will be observed that when the tongue is in vertical position the ball 16 lies substantially in the axis of the steering head, so that regardless of the steering position of the tongue,—that is, regardless of whether it is turned to right or left of normal straight forward postion,—the ball will be in position for engagement by the hook 15.

As the tongue is swung downwardly the ball moves out of the axis of the steering head, but the groove 17 is of sufficient width to permit transverse sliding movement of the ball without causing disengagement, thus permitting so-called "side lift" operation.

It will be understood that the invention may be variously modified and embodied within the scope of the subjoined claims.

I claim as my invention:

1. In a lifting truck, in combination, a main frame, an elevating frame pivotally mounted thereon for upward and rearward movement with respect thereto, a steering head mounted on said main frame, a steering tongue pivotally mounted on said steering head, a bell crank pivotally mounted on said elevating frame, a hook pivoted to one arm of said bell crank and adapted to engage said steering tongue, and a link pivotally connected to the other arm of said bell crank and pivotally connected to said main frame.

2. In a lift truck, in combination, a main frame, an elevating frame pivotally mounted thereon for vertical and longitudinal movement with respect thereto, a steering head mounted on said main frame, a steering tongue pivotally mounted on said steering head, said steering tongue being provided with a rearward extension terminating in a member having substantially vertical movement, a bell crank pivotally mounted on said elevating frame, a hook pivotally connected to said bell crank and adapted to engage said member, and a second link pivotally connected to said bell crank and to said main frame.

3. In a lift truck, in combination, a main frame, an elevating frame mounted for upward and rearward movement with respect thereto, a link operatively interposed between said frames, a steering head mounted on said main frame, a steering tongue pivotally mounted on said steering head, and means operative independently of said link and providing lifting connections between said tongue and elevating frame adapted to apply lifting thrust to said frame in substantially the direction of movement thereof.

4. In a life truck, in combination, a main frame, an elevating frame mounted for upward and rearward movement with respect thereto, a link operatively interposed between said frames, a steering head mounted on said main frame, a steering tongue pivotally mounted on said steering head, and means operative independently of said link and providing lifting connections between said tongue and elevating frame adapted to apply lifting thrust to said frame in a substantially vertical direction at the beginning of lifting movement but in a direction constantly shifting in the direction of movement of said elevating frame as lifting movement continues.

5. In a lifting truck, the combination of a main frame, an elevating frame, a toggle comprising a link pivotally connected to the main frame, and a rocking member fulcrumed on the elevating frame and pivotally connected with said link, a steering tongue, and means cooperative with said steering tongue to raise said rocking member bodily with said elevating frame.

6. In a lifting truck, the combination of a main frame, an elevating frame, a toggle comprising a link pivotally connected to the main frame, and a rocking member fulcrumed on the elevating frame and pivotally connected with said link, a steering tongue, and means releasably engageable with said steering tongue to raise said rocking member bodily with said elevating frame.

7. In a lifting truck, the combination of a main frame, an elevating frame, a toggle comprising a link pivotally connected to the main frame, and a rocking member fulcrumed on the elevating frame and having a forwardly extending arm and a rearwardly extending arm pivotally connected with said link, a steering tongue, and means pivotally connected with said forwardly extending arm and cooperative with said steering tongue to raise said rocking member bodily with said elevating frame.

8. In a lifting truck, the combination of a main frame, an elevating frame, a toggle comprising a link pivotally connected to the main frame, and a rocking member fulcrumed on the elevating frame and having a forwardly extending arm and a rearwardly extending arm pivotally connected to said link, a steering tongue, and means pivotally connected with said forwardly extending arm and releasably engageable with said steering tongue to raise said rocking member bodily with said elevating frame.

9. In a lifting truck, in combination, a main frame, an elevating frame carried thereby, a vertically swinging steering lever, a toggle connecting said main and elevating frames and adapted when straightened, to lift said elevating frame, and means for straightening said toggle by operation of the steering lever comprising a toggle actuating link associated with said toggle and normally separated from the steering lever and having a portion thereof adapted for engagement with said steering lever for operation thereby in any usual steering position of the same.

10. In a lifting truck, in combination, a main frame, an elevating frame carried thereby, a steering head mounted on said main frame, a steering tongue pivotally mounted on said steering head and having a portion thereof moving substantially in the axis of the steering head during vertical reciprocation of said tongue, a toggle connecting said main and elevating frames and adapted, when straightened, to lift said elevating frame and means for straightening said toggle by operation of the steering lever comprising a toggle actuating link associated with said toggle and normally separated from the steering tongue and having a portion movable substantially into the axis of said steering head for operative engagement with the steering tongue in any usual steering position of the same.

In testimony whereof, I have signed my name to this specification this 18th day of April, 1928.

WILLIAM STUEBING, Jr.